United States Patent
Deng

(10) Patent No.: US 8,529,131 B2
(45) Date of Patent: Sep. 10, 2013

(54) BALL TRANSFER UNIT

(75) Inventor: Hongtao Deng, Guangdong (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 28 days.

(21) Appl. No.: 13/381,942

(22) PCT Filed: Dec. 7, 2011

(86) PCT No.: PCT/CN2011/083656
§ 371 (c)(1),
(2), (4) Date: Dec. 31, 2011

(87) PCT Pub. No.: WO2013/082775
PCT Pub. Date: Jun. 13, 2013

(65) Prior Publication Data
US 2013/0142468 A1 Jun. 6, 2013

(51) Int. Cl.
*F16C 29/04* (2006.01)
*F16C 19/02* (2006.01)
*F16C 33/32* (2006.01)
*B65B 13/00* (2006.01)

(52) U.S. Cl.
USPC .............. 384/49; 384/99; 384/490; 193/35 R; 193/35 MD

(58) Field of Classification Search
USPC ........... 384/49, 99, 490–491, 507; 193/35 A, 193/35 B, 35 MD, 35 R, 35 SS
See application file for complete search history.

(56) References Cited

U.S. PATENT DOCUMENTS

| | | | | |
|---|---|---|---|---|
| 4,459,909 A * | 7/1984 | Takagi | .......................... | 100/295 |
| 4,553,795 A * | 11/1985 | Takagi | .......................... | 384/49 |
| 4,696,583 A * | 9/1987 | Gorges | .......................... | 384/49 |
| 4,871,052 A * | 10/1989 | Huber | .......................... | 193/35 MD |
| 5,464,086 A * | 11/1995 | Coelln | .......................... | 193/35 MD |
| 5,516,211 A * | 5/1996 | Barnes et al. | .......................... | 384/49 |
| 5,533,604 A * | 7/1996 | Brierton | .......................... | 193/35 MD |
| 5,540,314 A * | 7/1996 | Coelln | .......................... | 193/35 MD |
| 6,129,195 A * | 10/2000 | Matheny | .......................... | 193/35 MD |
| 6,279,716 B1* | 8/2001 | Kayatani et al. | .......................... | 193/35 MD |
| 6,457,865 B1* | 10/2002 | Masciarelli, Jr. | .......................... | 384/49 |
| 6,516,934 B2* | 2/2003 | Masciarelli, Jr. | .......................... | 193/35 SS |
| 6,814,212 B1* | 11/2004 | Ebersole | .......................... | 384/49 |
| 7,007,787 B2* | 3/2006 | Pallini et al. | .......................... | 193/35 MD |
| 7,222,476 B2* | 5/2007 | Hishida | .......................... | 56/12.7 |
| 7,370,746 B2* | 5/2008 | Iguchi et al. | .......................... | 193/35 MD |

FOREIGN PATENT DOCUMENTS
EP 1640295 A1 * 3/2006

* cited by examiner

*Primary Examiner* — Marcus Charles
(74) *Attorney, Agent, or Firm* — Cheng-Ju Chiang

(57) ABSTRACT

The present invention provides a ball transfer unit, which includes: a main body, a first rotating body, and a plurality of second rotating bodies arranged between the main body and the first rotating body. The main body has an end forming a receiving chamber and thus forming a receiving chamber sidewall. The second rotating bodies are rotatably arranged on the receiving chamber sidewall. The main body forms an air entrance passage in communication with the receiving chamber. The receiving chamber sidewall extends out to form a bearing section corresponding to the air entrance passage. The bearing section has a side surface in which air outlet ports are formed. The ball transfer unit of the present invention prevents powder dusts from falling therein, ensures smooth operation of the ball transfer unit, and extends the lifespan.

4 Claims, 4 Drawing Sheets

BALL TRANSFER UNIT

BACKGROUND OF THE INVENTION

1. Field of the Invention

The present invention relates to a ball transfer unit, and in particular to a ball transfer unit comprising an air entrance passage.

2. The Related Arts

As shown in FIG. 1, a conventional ball transfer unit comprises: a main body 100, a first rotating body 200, and a plurality of second rotating bodies 300 arranged between the main body 100 and the first rotating body 200. The main body 100 has an end forming a receiving chamber 110 and thus forming a receiving chamber sidewall 112. The second rotating bodies 300 are rotatably arranged on the receiving chamber sidewall 112. The main body 100 has an opposite end that forms a connection section 120. The receiving chamber sidewall 112 has a free end forming a stop rim 114 extending to each other for retaining and supporting the second rotating bodies 300. When the ball transfer unit is used in an application where there are a lot of powder dusts, such as a glass substrate cutting machine, the powder dusts may fall into the tiny gap between the first rotating body 200 and the stop rim 114 and converts rolling friction between the first rotating body 200 and the second rotating bodies 300 into sliding friction, thereby increasing the friction force therebetween, affecting the performance of the ball transfer unit and shortening the lifespan of the ball transfer unit.

SUMMARY OF THE INVENTION

An objective of the present invention is to provide a ball transfer unit, which prevents powder dusts from falling therein, ensures the performance of operation, and extends the lifespan.

To achieve the objective, the present invention provides a ball transfer unit, which comprises: a main body, a first rotating body, and a plurality of second rotating bodies arranged between the main body and the first rotating body. The main body has an end forming a receiving chamber and thus forming a receiving chamber sidewall. The second rotating bodies are rotatably arranged on the receiving chamber sidewall. The main body forms an air entrance passage in communication with the receiving chamber. The receiving chamber sidewall extends out to form a bearing section corresponding to the air entrance passage. The bearing section having a side surface in which air outlet ports are formed.

The air entrance passage has an end located in a side surface of the main body and an opposite end arranged in a center of the receiving chamber.

The air outlet ports are uniformly arranged in the side surface of the bearing section.

The air outlet pots comprise through holes or recesses.

The efficacies of the present invention are as follows: The present invention provides a ball transfer unit, which forms an air entrance passage in communication with a receiving chamber. The air entrance passage draws in air to blow off foreign objects, such as powder dusts, present on a receiving chamber sidewall to thereby ensure smooth operation of the ball transfer unit and extend the lifespan.

For better understanding of the features and technical contents of the present invention, reference will be made to the following detailed description of the present invention and the attached drawings. However, the drawings are provided for the purposes of reference and illustration and are not intended to impose undue limitations to the present invention.

BRIEF DESCRIPTION OF THE DRAWINGS

The technical solution, as well as beneficial advantages, will be apparent from the following detailed description of an embodiment of the present invention, with reference to the attached drawings. In the drawings.

DETAILED DESCRIPTION OF THE PREFERRED EMBODIMENTS

To further expound the technical solution adopted in the present invention and the advantages thereof, a detailed description is given to a preferred embodiment of the present invention and the attached drawings.

Figure 1:
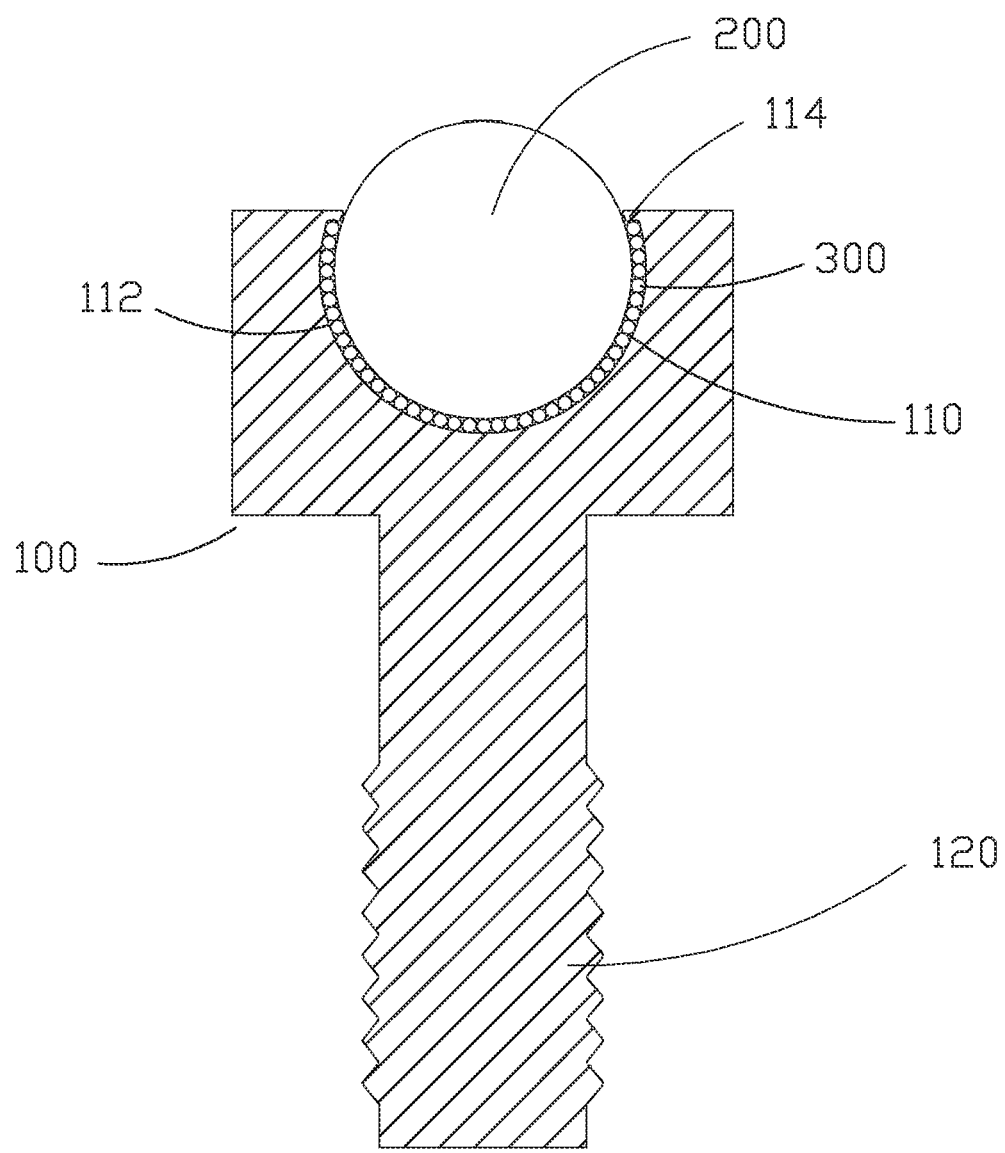
FIG. 1 is a schematic view showing a conventional ball transfer unit.
Figure 2:
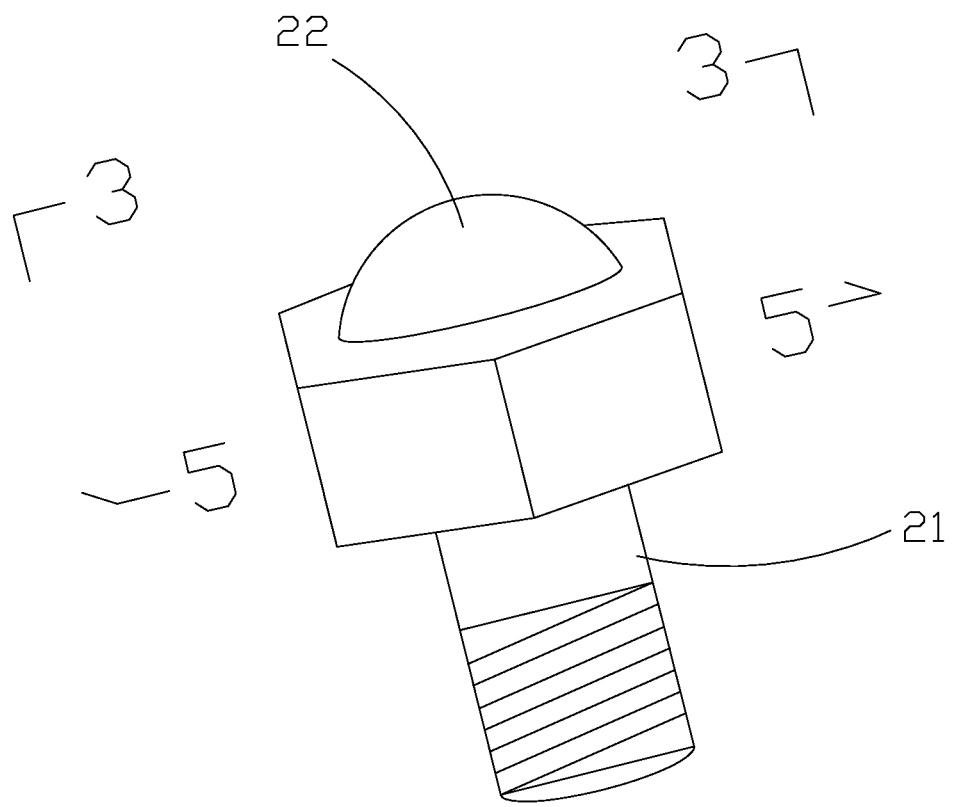
FIG. 2 is a perspective view showing a ball transfer unit according to the present invention.
Figure 3:
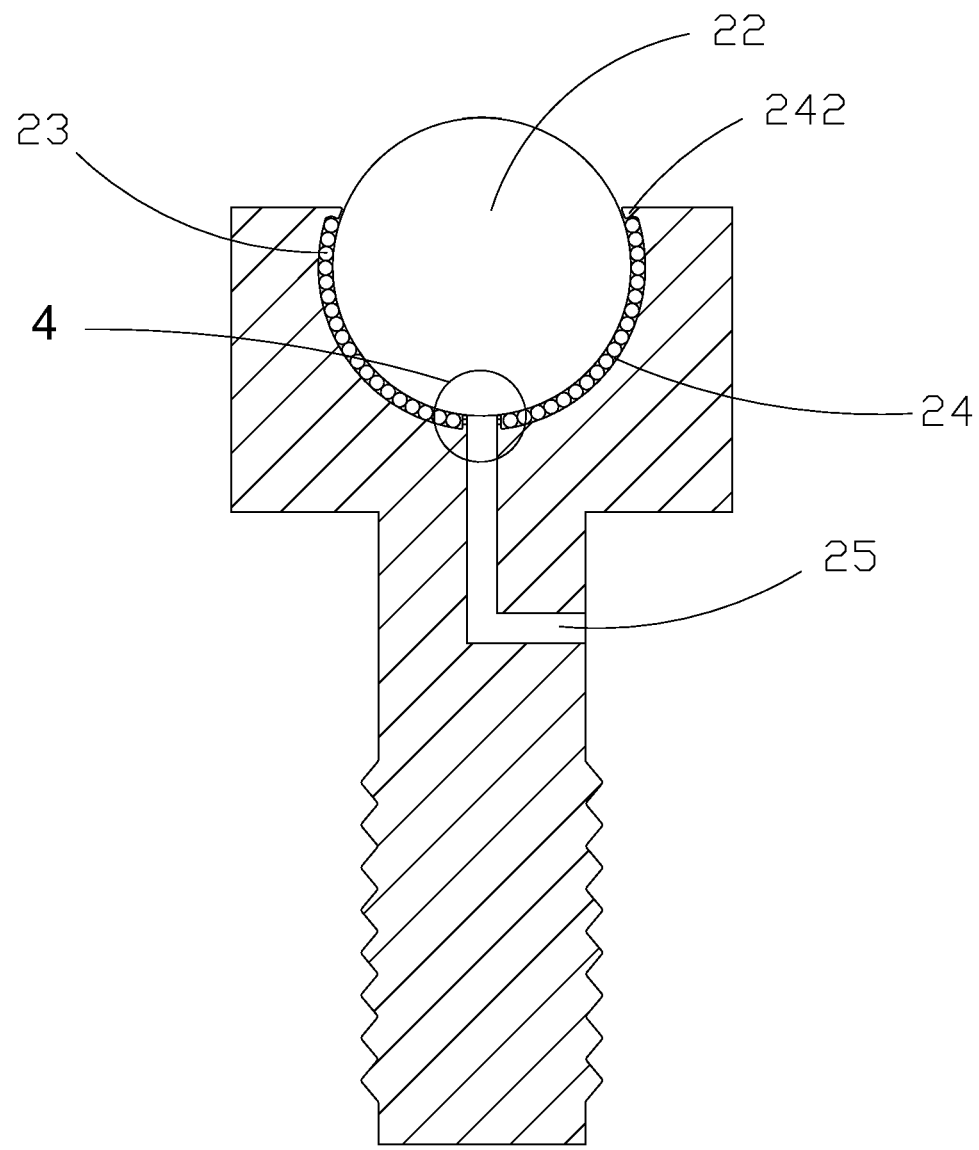
FIG. 3 is a cross-sectional view of the ball transfer unit taken along line 3-3 of FIG. 2.
Figure 4:
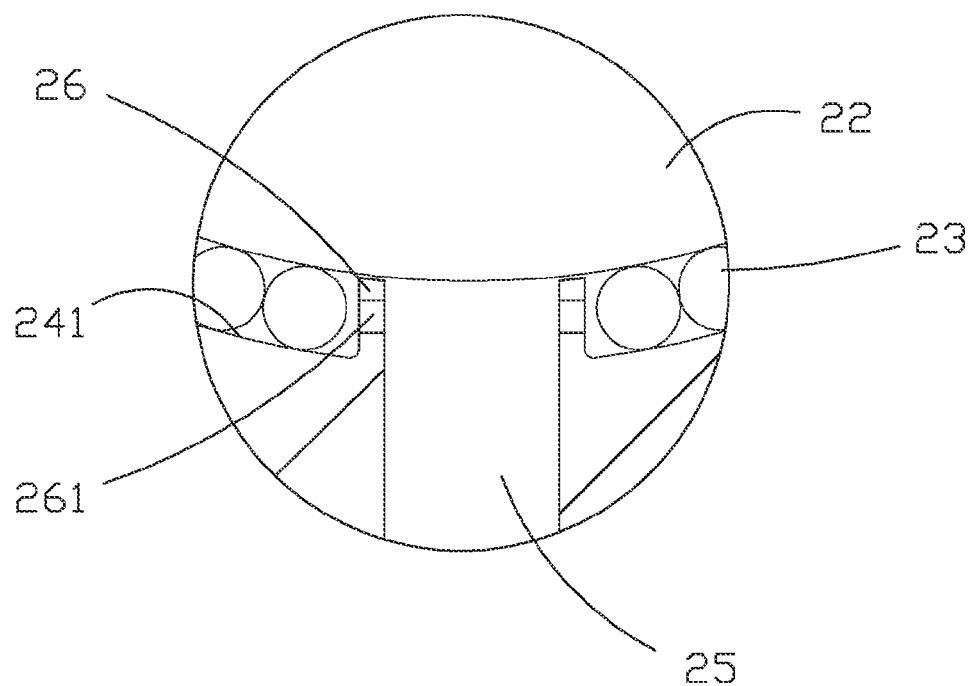
FIG. 4 is an enlarged view of a circled portion that is marked "4" in FIG. 3.
Figure 5:
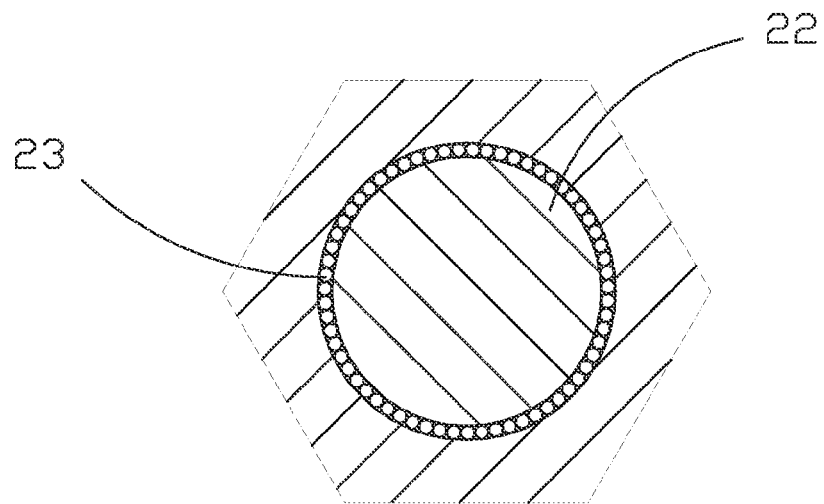
FIG. 5 is a cross-sectional view of the ball transfer unit taken along line 5-5 of FIG. 2.

As shown in FIGS. 2-5, the present invention provides a ball transfer unit, which comprises: a main body 21, a first rotating body 22, and a plurality of second rotating bodies 23 that is arranged between the main body 21 and the first rotating body 22. The main body 21 has an end forming a receiving chamber 24 and thus forms a receiving chamber sidewall 241. The second rotating bodies 23 are rotatably arranged on the receiving chamber sidewall 241. The main body 231 forms an air entrance passage 25 in communication with the receiving chamber 24 and the receiving chamber sidewall 241 extends out to form a bearing section 26 corresponding to the air entrance passage 25. The bearing section 26 has a side surface in which air outlet ports 261 are formed. The air outlet ports 261 can be uniformly arranged on the side surface of the bearing section 26. The air outlet ports 261 can be through holes or recesses.

The receiving chamber sidewall 241 has a free end forming a stop rim 242 and the second rotating bodies 23 are arranged between the stop rim 242 and the bearing section 26.

Preferably, the air entrance passage 25 has an end located in a side surface of the main body 21 and an opposite end arranged in a center of the receiving chamber 24.

In operation, the present invention uses the air entrance passage 25 to draw in clean dry air that blows off foreign objects, such as powder dusts, present on the receiving chamber sidewall so as to prevent the foreign objects from getting stuck in the gap that convert rolling friction of the ball transfer unit into sliding friction and affect the performance of operation, thereby extending the lifespan.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A ball transfer unit, which comprises a main body, a first rotating body, and a plurality of second rotating bodies arranged between the main body and the first rotating body, the main body having an end forming a receiving chamber and thus forming a receiving chamber sidewall, the second rotating bodies being rotatably arranged on the receiving chamber sidewall, the main body forming an air entrance passage in communication with the receiving chamber for supplying an airflow to the receiving chamber, the receiving chamber sidewall extending out to form a bearing section that surrounds and delimits the air entrance passage, the bearing section having a side surface in which air outlet ports are formed, the receiving chamber sidewall having a free end forming a stop rim, whereby the second rotating bodies are confined between the stop rim and the bearing section.

2. The ball transfer unit as claimed in claim 1, wherein the air entrance passage has an end located in a side surface of the main body and an opposite end arranged in a center of the receiving chamber.

3. The ball transfer unit as claimed in claim 1, wherein the air output ports are uniformly arranged in the side surface of the bearing section.

4. The ball transfer unit as claimed in claim 3, wherein the air outlet ports comprise through holes or recesses.

\* \* \* \* \*